United States Patent

Hog et al.

[11] Patent Number: 5,825,148
[45] Date of Patent: Oct. 20, 1998

[54] CIRCUIT ARRANGEMENT, PARTICULARLY FOR A WIPER ARRANGEMENT FOR MOTOR VEHICLE WINDSHIELDS

[75] Inventors: Norbert Hog, Buehl; Rainer Pientka, Achern; Hans Meier, Ottersweier; Guenther Riehl, Buehlertal; Henry Blitzke, Buehl, all of Germany

[73] Assignee: Robert Bosch GmbH, Stuttgart, Germany

[21] Appl. No.: 765,868
[22] PCT Filed: Nov. 23, 1995
[86] PCT No.: PCT/DE95/01636
§ 371 Date: Jan. 10, 1997
§ 102(e) Date: Jan. 10, 1997
[87] PCT Pub. No.: WO96/19366
PCT Pub. Date: Jun. 27, 1996

[30] Foreign Application Priority Data

Dec. 19, 1994 [DE] Germany .................. 44 45 107.5

[51] Int. Cl.⁶ .................................................. B60S 1/08
[52] U.S. Cl. .................... 318/443; 318/DIG. 2
[58] Field of Search ................................. 318/443, 444, 318/DIG. 2; 307/9.1, 10.1

[56] References Cited

U.S. PATENT DOCUMENTS

| | | | |
|---|---|---|---|
| 3,611,094 | 10/1971 | Bischoff | 318/443 X |
| 3,671,691 | 6/1972 | Suzuki et al. | |
| 4,286,200 | 8/1981 | Brown | 318/443 |
| 4,588,935 | 5/1986 | Kaneiwa et al. | 318/483 |
| 4,673,853 | 6/1987 | Tsunoda et al. | 318/443 |
| 4,689,535 | 8/1987 | Tsunoda et al. | 318/443 |
| 4,859,867 | 8/1989 | Larson et al. | 318/444 X |
| 4,992,671 | 2/1991 | Gille et al. | |
| 5,239,244 | 8/1993 | Teder | 318/443 |

*Primary Examiner*—Bentsu Ro
*Attorney, Agent, or Firm*—Spencer & Frank

[57] ABSTRACT

A circuit arrangement, in particular for a wiper arrangement for motor vehicle windshields, having an electric wiper motor and a step-switching unit for the wiper motor that can be actuated via a control device, and wherein at least one output of the control device that is assigned to a specific wiper speed is connected to at least one input of the step-switching unit that determines this wiper speed.

A switching means (18) is parallel-connected to the outputs (20, 24) of the control device (12), by way of which a voltage source ($U_{bat}$) can be connected with the inputs (22, 26) of the step-switching unit (14), which are assigned to the outputs (20, 24) of the control device (12).

9 Claims, 2 Drawing Sheets

CIRCUIT ARRANGEMENT, PARTICULARLY FOR A WIPER ARRANGEMENT FOR MOTOR VEHICLE WINDSHIELDS

This application is a National Stage application of International Application PCT/DE95/01636, filed on Nov. 23, 1995, published as WO96/19366 Jun. 27, 1996.

BACKGROUND OF THE INVENTION

The invention relates to a circuit arrangement, particularly for a wiper arrangement for motor vehicle windshields having an electric wiper motor and a step-switching unit for the wiper motor that can be actuated via a control device, and wherein at least one output of the control device that is assigned to a specific wiper speed is connected with at least one input of the step-switching unit that determines this wiper speed.

PRIOR ART

The use of wiper arrangements in motor vehicles for motor vehicle windshields that have an electric wiper motor is known. For the actuation of the wiper motor, control devices are known, which use so-called rain sensors to detect the amount of moisture hitting the outside of the motor vehicle. Depending on the amount of moisture, that is how heavy the rain is, the control device supplies varying control signals to the wiper motor. For this, a step switching unit is connected in series before the wiper motor, which permits a varying connection of the wiper motor, for example with two different speeds. The wiper motor is connected via the control device and the step switching unit on the one hand with a voltage source while, on the other hand, a coil reversal for the wiper motor is realized, which permits a varying wiper speed for the wiper motor.

However, one disadvantage with the known circuit arrangements is that in case of a failure of the control device, it is no longer possible to actuate the wiper motor and thus the wiper arrangements of the motor vehicle. An actuation of the wiper arrangement is impossible, for example, if the control device fails during a specific use of the motor vehicle at a time when it is raining. The drive would thus have to be interrupted until the rain stops.

SUMMARY AND ADVANTAGES OF THE INVENTION

The above drawbacks of the prior art arrangements generally are overcome according to the present invention by a circuit arrangement, in particular for a wiper arrangement for motor vehicle windshields, having an electric wiper motor and a step-switching unit for the wiper motor that can be actuated via a control device, wherein: at least one output of the control device that is assigned to a specific wiper speed is connected with at least one input of the step-switching unit that determines this wiper speed; a switching means is parallel-connected to the outputs of the control device via which switching means a voltage source ($U_{bat}$) can be connected to the inputs of the step-switching unit that are assigned to the outputs of the control device (12); the step-switching unit has first and second switching stages that can be actuated via the two inputs; the first switching stage, which is connected to and actuated by the first input of the step-switching unit, establishes a connection to the voltage source ($U_{bat}$); and the second switching stage connects the output of the first switching stage with one of two inputs of the wiper motor.

On the other hand, the circuit arrangement according to the invention described above has the advantage that an actuation of the wiper arrangement for the motor vehicle is possible even if the control device fails. Owing to the fact that a switching means is connected parallel to the control outputs of the control device, by way of which a voltage source can be connected to the inputs of the step-switching unit that are assigned to the outputs of the control device, the defective control device can be bridged in a simple way, so that an actuation of the wiper arrangement becomes possible. Through this additional option for intervening manually in the circuit arrangement for actuating the wiper motor, it is possible to maintain an emergency operation of the wiper arrangement if the control device has failed. By securing the wiper operation of the wiper arrangement in this way, it is possible, for example, to continue a drive that was interrupted as a result of a failed wiper arrangement control device.

Advantageous embodiments of the invention result from the features named in the dependent claims.

BRIEF DESCRIPTION OF THE DRAWINGS

The invention is explained in more detail in the following with exemplary embodiments and with the aid of the coordinated drawings wherein.

DETAILED DESCRIPTION OF THE EXEMPLARY EMBODIMENTS

Figure 1:
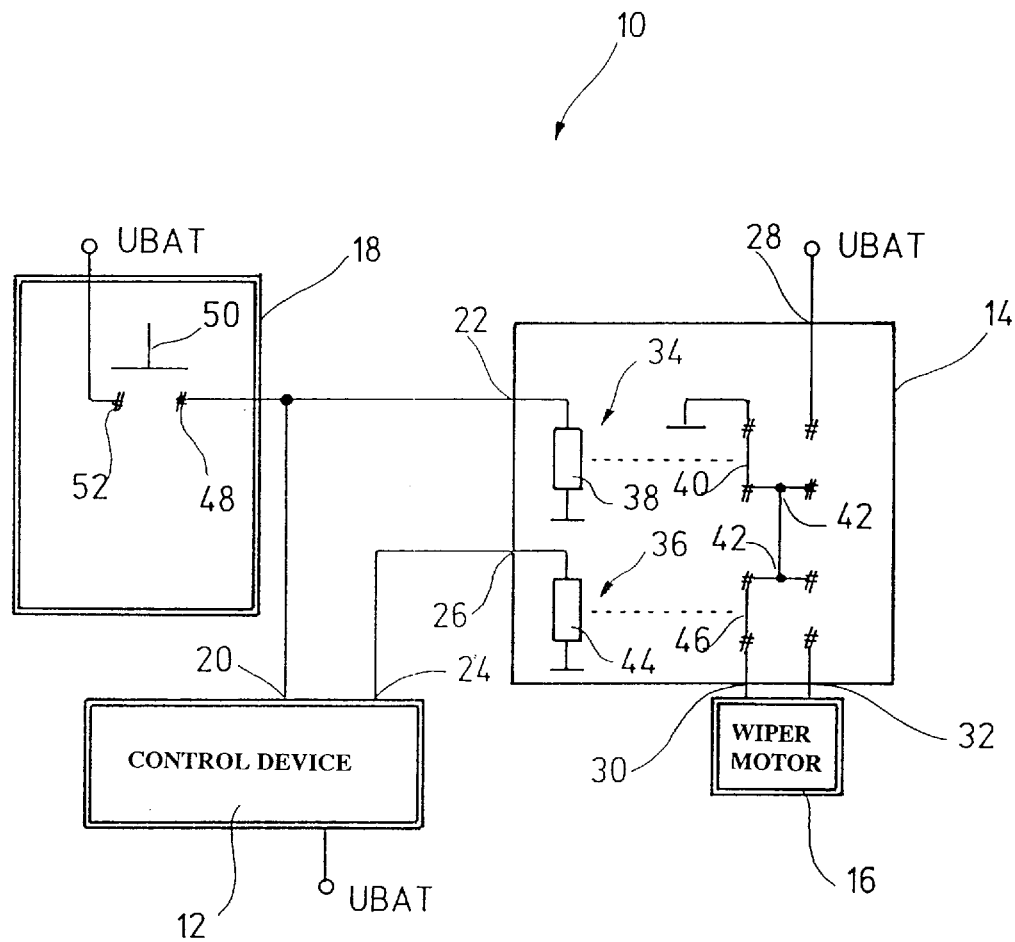
FIG. 1, is a circuit arrangement for securing a one-stage emergency run according to the invention.

FIG. 1 shows a circuit arrangement generally referred to as 10 for a wiper arrangement in a motor vehicle. The circuit arrangement 10 comprises a control device 12, a step-switching unit 14, a wiper motor 16 as well as a switching means 18. A first output 20 of the control device 12 is connected to a first input 22 of the step-switching unit 14. A second output 24 of the control device 12 is connected to a second input 26 of the step-switching unit 14. The step-switching unit 14 has another input 28, which is connected to a voltage source, preferably a motor vehicle battery $U_{bat}$. Two additional outputs 30 and 32 of the step-switching unit 14 are connected to a wiper motor 16. The wiper motor 16 is equipped with different brush arrangements, which function to generate varying rotational numbers for the wiper motor. A first brush arrangement, for example for a lower rotational number, is connected to the output 30 and a second brush arrangement, for example for a higher rotational number, is connected to the output 32 of the step-switching unit 14.

Arranged within the step-switching unit 14 is a first switching means, for example an electromagnetic relay 34 and a second switching means, for example also an electromagnetic relay 36. The exciting coil 38 of the relay 34 is connected on the one hand with the input 22 of the step-switching unit 14 and on the other hand with a ground potential. A switching contact 40 of the relay 38 connects in the resting position a center contact 42 with the ground potential. An exciting coil 44 of the second relay 36 is on the one hand connected to the second input 26 of the step-switching unit 14 and on the other hand with the ground potential. A switching contact 46 of the relay 36 in the resting position is connected to the center contact 42 and the output 30 of the step-switching unit 14. The first input 22 of the step-switching unit 14 is furthermore connected to a first contact 48 of a switching element 50 of the switching means 18. A second contact 52 of the switching element 50 is connected to the voltage source $U_{bat}$. In the resting position, the switching element 50 is opened, meaning the contacts 48 and 52 are not connected.

The circuit arrangement shown in FIG. 1 functions as follows:

For the normal operation and depending on the moisture accumulating externally on the motor vehicle, either the first output 20 or the second output 24 is connected to the voltage source $U_{bat}$ by means of the control device 12, which in this case has a control circuit that cannot be viewed in more detail. If, for example, it is detected that the amount of moisture that has accumulated is low, then the voltage source is connected to the first output 20, so that the exciting coil 38 of the relay 34 receives current via the connection to the first input 22 of the step-switching unit 14. The switching contact 40 subsequently establishes a connection between the center contact 42 and the voltage source $U_{bat}$, which is connected to the input 28 of the step-switching unit 14. An operational voltage $U_b$ is thus switched through to the first output 30 of the step-switching unit via the switching contact 46 of the second relay 36, which switching contact is in the resting position. The first switching stage of the wiper motor 16, which is connected to the output 30, is thus supplied with current, so that this wiper motor with its here assumed low wiper speed actuates the wiper arrangement of the motor vehicle.

For the case that the externally accumulating moisture on the motor vehicle increases, the control device 12 connects the voltage source $U_{bat}$ simultaneously to the first output 20 and the second output 24. The exciting coil 44 of the relay 36 is supplied with current via the connection between the second input 26 of the step-switching unit 14 and the second output 24 of the control device 12. Subsequently, the switching contact 46 of the relay 36 connects the center contact 42 with the output 32 of the step-switching unit 14. As a result of this change-over, the second switching stage of the wiper motor 10 is now connected to the voltage source $U_{bat}$ via the input 28, the switching contact 40 of the relay 34 and the switching contact 46 of the relay 36. For the assumed example, a higher wiper speed is thereby provided for the wiper arrangement of the motor vehicle.

For the case that the control device 12 fails for any reason, for example as a result of a defect in the control circuit for the control device 12 or a defect in the sensors that detect the externally accumulating moisture, the relays 34 and 36 are separated from any possibility of being connected to the voltage source $U_{bat}$, so that an operation of the wiper motor 16 is no longer possible.

For this malfunction, the switching means 18, which is preferably designed as steering column switch in a motor vehicle, can connect the contacts 48 and 52 if the switching element 50 is actuated, so that the voltage source $U_{bat}$ is connected to the input 22 of the step-switching unit 14. As a result, the exciting coil 38 of the relay 34 can again be supplied with current, so that the switching contact 40 establishes a connection via the input 28 of voltage source $U_{bat}$ with the first switching stage of the wiper motor 16. The wiper motor 16 thus can be operated despite the failure of the control device 12, at least in its first switching stage, so that an emergency operation is ensured.

Figure 2:
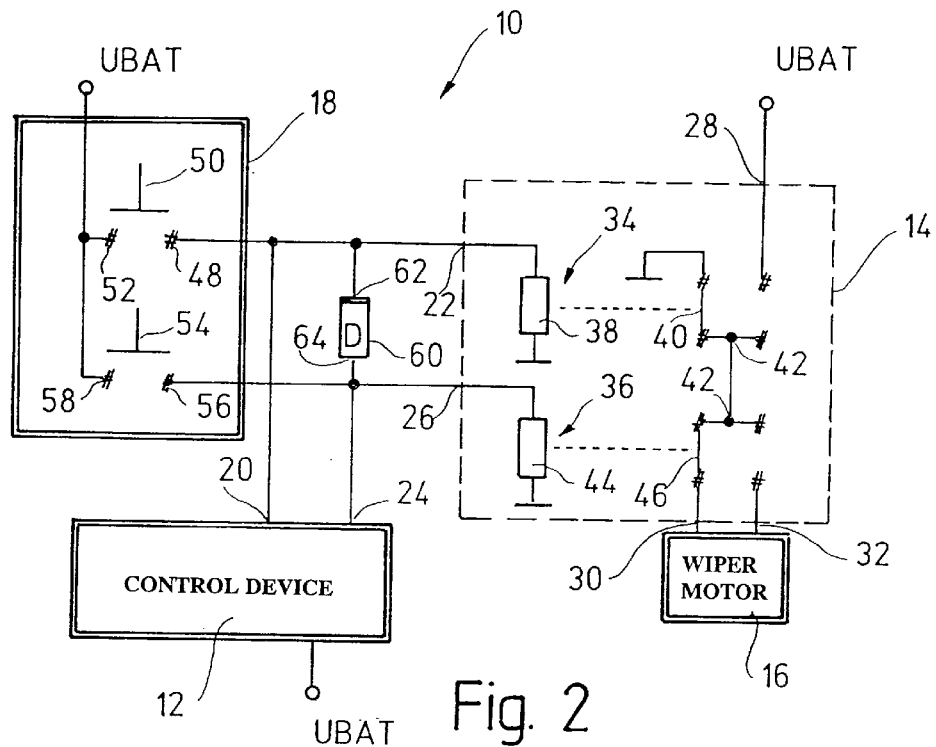
FIG. 2, is a circuit arrangement of a first embodiment for securing a two-stage emergency run according to the invention; and, FIG. 3, is a circuit arrangement of another embodiment for securing a two-stage emergency run according to the invention.

FIG. 2 shows a modification of the circuit arrangement 10 shown in FIG. 1, wherein the same parts are given the same reference numbers and are not explained again. In addition to the circuit arrangement 10 shown in FIG. 1, the switching means 18 here has a second switching element 54. A contact 56 of the switching element 54 is connected to the second input 26 of the step-switching unit 14. Another contact 58 of the switching element 54 is connected to the voltage source $U_{bat}$. A diode 60 is connected between the inputs 22 and 26 of the step-switching unit 14; the cathode 62 of this diode is connected to the input 22 and its anode 64 to the input 26.

The circuit arrangement 10 shown in FIG. 2 serves the following function:

The normal function corresponds to the circuit arrangement 10 shown in FIG. 1 and will not be explained again here. In case of a failure of the control device 12, it is again possible to supply current to the exciting coil 38 of the relay 34 via the switching element 50, so that the wiper motor 10 with its first switching stage, which is actuated via the output 30 of the step-switching unit 14, can be operated. However, if the wiper motor 10 is to be operated during the emergency situation applicable here in the second switching stage, for the example shown at the faster wiper speed, this is possible through a step-switching of the switching means 18 to its switching element 54. When actuating the switching element 54, the contacts 56 and 58 are connected, so that the voltage source $U_{bat}$ is switched through to the second input 26 of the step-switching unit 14. At the same time, the diode 60 is switched to forward, so that the voltage source $U_{bat}$ is also connected to the first input 22 of the step-switching unit 14 via the diode 60. In that case, the step-switching unit 14 operates as during the normal operation, meaning the switching contacts 40 or 46 are switched such that a connection is made between the input 28 and the output 32 of the step-switching unit 14, so that the second switching stage, that is the one for a higher wiper speed, of the wiper motor 16 is connected to the voltage source $U_{bat}$.

Thus, an emergency operation of the wiper motor 16 is possible by way of the switching means 18 during its first switching stage as well as during its second switching stage. The diode 60 connected between the inputs 22 and 26 ensures that if the switching element 50 is actuated, the operating voltage $U_b$ from the voltage source $U_{bat}$ is blocked for the second input 26 of the step-switching unit 14. This operating voltage therefore is only present at the first input 22. In case the switching element 54 is actuated, however, the diode 60 is switched to forward, so that the operating voltage $U_b$ can be present simultaneously at the inputs 22 and 26.

Figure 3:
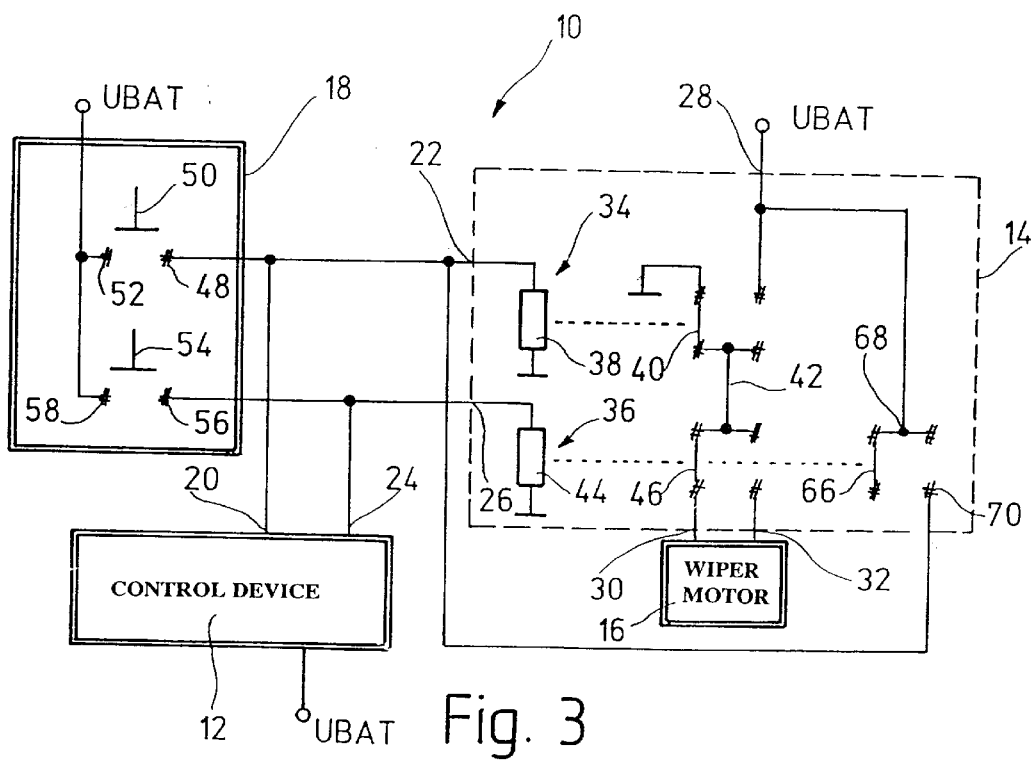

FIG. 3 shows another modification of the circuit arrangement 10, for which an emergency operation function of the wiper motor 16 is realized for both switching stages. The same components as in the preceding figures are given the same reference numbers and are not explained again. In the circuit arrangement 10 shown in FIG. 3, the relay 36 has another switching contact 66 that is designed as closer. A resting contact 68 of switching contact 66 is connected to the input 28 of the step-switching unit 14 and thus also with the voltage source $U_{bat}$. The closing contact 70 of the switching contact 66 is connected to the first input 22 of the step-switching unit 14. The additional arrangement of the switching contact 66 of the relay 36 achieves that the second switching stage of the wiper motor 16 can be added when the switching element 54 of switching means 18 is actuated. The voltage source $U_{bat}$ is connected to the exciting coil 44 of the relay 36 via the closed switching element 54. The switching contact 46 subsequently connects the center contact 42 with the output 32 of the step-switching unit 14. At the same time, the switching contact 66 connects the resting contact 68 with the closing contact 70, so that the first input 22 is connected to the input 28 of the step-switching unit 14 and the operating voltage $U_b$ of the voltage source $U_{bat}$ is thus also present. The switching contact 40 subsequently connects the input 28 with the center contact 42, so that the operating voltage $U_b$ is present at the output 32 of the step-switching unit 14. An emergency operation of the wiper motor 16 for its two switching stages is made possible through this simple relay circuit in connection with the switching means 18.

A third relay can be provided in place of the additional switching contact 66 of the relay 36, the exciting coil of which is connected parallel to exciting coil 44 of the relay 36. This additional relay would then realize the connection between the input 28 and the input 22 of the step-switching unit 14.

We claim:

1. Circuit arrangement for a wiper arrangement for motor vehicle windshields, said circuit arrangement having an electric wiper motor and a step-switching unit for the wiper motor that is actuated via a control device, and wherein; at least one output of the control device that is assigned to a specific wiper speed is connected with at least one input of the step-switching unit that determines this wiper; speed a switching means is parallel-connected to the outputs of the control device to connect a voltage source ($U_{bat}$) to the inputs of the step-switching unit that are assigned to the respective outputs of the control device when the switching means is actuated; the step-switching unit has two inputs and first and second switching stages that are actuated via the two inputs; the first switching stage, which is connected with the first input of the step-switching unit, establishes a connection to the voltage source ($U_{bat}$); and the second switching stage connects the output of the first switching stage with one of two inputs of the wiper motor.

2. Circuit arrangement according to claim 1, wherein the switching means has a number of switching elements; and with the number of switching elements for the switching means corresponding to the switching stages of the step-switching unit.

3. Circuit arrangement according to claim 1, wherein each of the number of switching elements of the switching means is connected in parallel with the respectively assigned output of the control device.

4. Circuit arrangement according to claim 3, wherein a first switching element of the switching means, when actuated, connects the first input of the step-switching unit to the voltage source ($U_{bat}$).

5. Circuit arrangement according to claim, 4 wherein upon actuation of a second switching element of the switching means, all inputs of the step-switching unit are connected to the voltage source ($U_{bat}$).

6. Circuit arrangement according to claim 5, wherein the inputs of the step-switching unit are connected via a diode, wherein a cathode of the diode is connected to the first input and an anode of the diode is connected to the second input.

7. Circuit arrangement according to claim 5, wherein the first input is connected to the voltage source ($U_{bat}$) via a further switching element that is assigned to the second input of the step-switching unit.

8. Circuit arrangement according to claim 7, wherein the further switching element is a closing contact of a relay that is connected to the second input.

9. Circuit arrangement according to claim 1, wherein the switching means is a steering column switch.

* * * * *